US010778743B2

(12) United States Patent
Maze et al.

(10) Patent No.: US 10,778,743 B2
(45) Date of Patent: Sep. 15, 2020

(54) METHOD FOR IDENTIFYING OBJECTS ACROSS TIME PERIODS AND CORRESPONDING DEVICE

(71) Applicant: CANON KABUSHIKI KAISHA, Tokyo (JP)

(72) Inventors: Frédéric Maze, Langan (FR); Franck Denoual, Saint Domineuc (FR); Cyril Concolato, Combs la Ville (FR); Jean Le Feuvre, Cachan (FR)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 15/323,037

(22) PCT Filed: Jul. 1, 2015

(86) PCT No.: PCT/EP2015/065046
§ 371 (c)(1),
(2) Date: Dec. 29, 2016

(87) PCT Pub. No.: WO2016/001336
PCT Pub. Date: Jan. 7, 2016

(65) Prior Publication Data
US 2017/0142183 A1 May 18, 2017

(30) Foreign Application Priority Data
Jul. 1, 2014 (GB) .................................. 1411734.5

(51) Int. Cl.
*G06F 15/16* (2006.01)
*H04L 29/06* (2006.01)
(Continued)

(52) U.S. Cl.
CPC ............ *H04L 65/608* (2013.01); *H04L 65/60* (2013.01); *H04L 67/02* (2013.01);
(Continued)

(58) Field of Classification Search
CPC ....... H04L 65/608; H04L 65/60; H04L 67/02; H04L 67/42; H04N 21/26258; H04N 21/8456; H04N 21/85406; H04N 21/8543
(Continued)

(56) References Cited

U.S. PATENT DOCUMENTS 9,357,275 B2 * 5/2016 Nagaraj ................ H04N 21/845
9,369,512 B2 * 6/2016 Thang .................... H04L 65/608
(Continued)

FOREIGN PATENT DOCUMENTS

CN 102550036 A 7/2012
CN 103621151 A 3/2014
(Continued)

OTHER PUBLICATIONS

Thomas Stockhammer, "Ad Insertion and Period Continuity", MPEG Meeting, Mar. 31, 2014-Apr. 4, 2014, Valencia, Motion Picture Expert Group or ISO/IEC JTC1/SC29/WG11, Mar. 28, 2014, XP030061736.
(Continued)

*Primary Examiner* — Melvin H Pollack
(74) *Attorney, Agent, or Firm* — Canon U.S.A., Inc. IP Division (57) ABSTRACT

A method for streaming data corresponding to one or more media items or combinations of media items, said media items or combinations of media items being organized into time periods. The method includes transmitting a description file to a client device, said description file being organized into data boxes, each one being related to a time period, at least one box comprising one or more level-one sub-boxes comprising parameters related to a media item or combination of media items for the given time period, each level-one sub-box being organized into one or more level-two sub-boxes dedicated to temporal segments of the corresponding
(Continued)

media item or combination of media items for the given time period, each level-two sub-box being organized into one or more level-three sub-boxes, each one being related to a portion of the temporal segment for the given media item or combination of media items.

13 Claims, 8 Drawing Sheets

(51) Int. Cl.
    *H04N 21/854*     (2011.01)
    *H04N 21/845*     (2011.01)
    *H04N 21/262*     (2011.01)
    *H04N 21/8543*     (2011.01)
    *H04L 29/08*     (2006.01)

(52) U.S. Cl.
    CPC ... *H04N 21/26258* (2013.01); *H04N 21/8456* (2013.01); *H04N 21/8543* (2013.01); *H04N 21/85406* (2013.01); *H04L 67/42* (2013.01)

(58) Field of Classification Search
    USPC .......................................................... 709/217
    See application file for complete search history.

(56) References Cited

U.S. PATENT DOCUMENTS

| | | | | |
|---|---|---|---|---|
| 9,596,447 | B2* | 3/2017 | Chen | H04N 19/597 |
| 9,607,132 | B2* | 3/2017 | van Brandenburg | G06F 21/10 |
| 9,654,532 | B2* | 5/2017 | Strigeus | G06F 16/2228 |
| 9,813,740 | B2* | 11/2017 | Panje | H04N 21/234363 |
| 9,852,219 | B2* | 12/2017 | Hannuksela | H04N 21/85406 |
| 9,866,608 | B2* | 1/2018 | Stockhammer | H04N 21/26258 |
| 9,900,609 | B2* | 2/2018 | Hannuksela | H04N 19/61 |
| 9,917,872 | B2* | 3/2018 | Wang | H04L 65/602 |
| 9,917,874 | B2* | 3/2018 | Luby | H04N 21/44209 |
| 9,954,717 | B2* | 4/2018 | Giladi | H04L 29/06476 |
| 9,992,250 | B2* | 6/2018 | Giladi | H04L 65/602 |
| 9,992,499 | B2* | 6/2018 | Su | H04N 19/142 |
| 10,044,784 | B2* | 8/2018 | Lian | H04L 65/607 |
| 10,165,028 | B2* | 12/2018 | Moustafa | H04L 65/60 |
| 10,225,319 | B2* | 3/2019 | Ye | H04L 67/02 |
| 10,277,660 | B1* | 4/2019 | Thang | H04L 65/4084 |
| 10,320,869 | B2* | 6/2019 | Lohmar | H04L 65/605 |
| 10,387,920 | B2* | 8/2019 | Tinsman | G06Q 30/0275 |
| 10,425,666 | B2* | 9/2019 | Ha | H04L 65/80 |
| 10,516,717 | B2* | 12/2019 | Van Brandenburg | H04L 65/608 |
| 10,523,776 | B2* | 12/2019 | Liu | H04N 21/2225 |
| 10,523,982 | B2* | 12/2019 | Oyman | H04N 21/6125 |
| 2014/0013003 | A1 | 1/2014 | Exton et al. | |
| 2018/0376177 | A1* | 12/2018 | Nugent | H04N 21/2381 |

FOREIGN PATENT DOCUMENTS

| | | |
|---|---|---|
| JP | 2017527160 A | 9/2017 |
| WO | 2014011584 A1 | 1/2014 |
| WO | 2014/057131 A1 | 4/2014 |

OTHER PUBLICATIONS

"Information Technology—Dynamic adaptive streaming over HTTP (DASH)—Part 3: Implementation Guidelines/AMD1: Alignment with ISO/IEC 23009-1:2014 and extensibility", 108 MPEG Meeting, Mar. 21, 2014-Apr. 4, 2014, Valencia, (Motion Picture Expert Group or ISO/IEC JTC1/SC29/WG11, No. N14354, Apr. 21, 2014, XP030021091.

Cyril Concolato, et al., "Comments on MPEG-DASH Amd.2", 108 MPEG Meeting, Mar. 31, 2014-Apr. 4, 2014, Valencia, Motion Picture Expert Group or ISO/IEC JTC1/SC29/WG11), No. m33208, Mar. 26, 2014, XP030061660.

"Information technology Dynamic adaptive streaming over HTTP (DASH) Part 1: Media presentation description and segment formats", May 15, 2014, XP055214031, Geneva, CH Retrieved from the Internet:URL:http://standards.iso.org/ittf/Publicly, AvailableStandards/c065274 ISO IEC 23009-1_20142ip, cited in the application paragraph [0004] and [0005].

Watanabe, et al., "DASH: Additional Parameters for Spatial Relationship Description (in CE-SRO)", 107. MPEG Meeting, Jan. 13, 2014-Jan. 17, 2014; San Jose; (Motion Picture Expert Group or ISO/IEC JTC1/SC29/WG11), No. m32204, Jan. 8, 2014, XP030060656, the whole document.

Tokumo et al., "DASH: signaling the continuity of adaptation sets across periods", 108. MPEG Meeting; Mar. 31, 2014-Apr. 4, 2014; Valencia; (Motion Picture Expert Group or ISO/IEC JTC1/SC291WG11),, No. m33112, Mar. 26, 2014, XP030061564, the whole document.

Concolato et al., "Identifying representations across periods in DASH", 109. MPEG Meeting; Jul. 7, 2014-Nov. 7, 2014; Sapporo; (Motion Picture Expert Group or ISO/IEC JTC1/SC291WG11), No. m34352, Jul. 2, 2014, XP030062725, the whole document.

* cited by examiner

METHOD FOR IDENTIFYING OBJECTS ACROSS TIME PERIODS AND CORRESPONDING DEVICE

CROSS REFERENCE TO RELATED APPLICATIONS

This application is a national phase application of PCT application No. PCT/EP2015/065046 filed on Jul. 1, 2015 and which claims the benefit under 35 U.S.C. § 119(a)-(d) of United Kingdom Patent Application No. 1411734.5 filed on Jul. 1, 2014. The above cited patent applications are incorporated herein by reference in their entirety.

FIELD OF THE INVENTION

The invention relates to a method and a device for transmitting media data, and more particularly Web-accessed compressed videos. Preferably, the streaming of media data is made over IP networks (like the Internet) by using the protocol HTTP.

BACKGROUND OF THE INVENTION

A media presentation forms a collection of encoded and deliverable versions of media content that is usually composed of one or several media content components also called media items such as audio, video or text. A combination of media items or components could also be considered. They can be sent from a server to a client for being jointly played by the client device. Media content is downloaded by the client from a server.

In this context, a new standard called DASH (for "Dynamic Adaptive Streaming over HTTP") has recently emerged (see "ISO/IEC 23009-1, Dynamic adaptive streaming over HTTP (DASH), Part 1: Media presentation description and segment formats"). This standard enables to create an association between a compact description of the content(s) of a media presentation and the HTTP addresses. Usually, this association is described in a file called a manifest file or description file. In the context of DASH, this manifest file is a file also called the MPD file (for Media Presentation Description).

When the client device gets the MPD file, the description of each encoded and deliverable version of media content can be easily known by the client. By reading the manifest file, the client is aware of the kind of media content components proposed in the media presentation and is aware of the HTTP addresses for downloading the associated media content components. Therefore, it can decide which media content components to download (via HTTP requests) and to play (decoding and play after reception of the media data segments).

The DASH standard allows describing a whole media presentation into one or more periods of time (noted "Period"). A Period describes of a set of media content components that have a common timeline as well as relationships on how they can be presented. Each of these Periods can contain the same set of media content components or a completely independent set of media content components (e.g. a period of time corresponding to a movie followed by another period of time corresponding to an advertisement followed itself by another period of time corresponding to the continuation of the movie . . . ).

In addition to this association, the DASH standard proposes, within a Period, to split each media content component into segments representing smaller periods of time. Thus it describes the association between HTTP addresses (or URLs) and the compact description of each media content component over a small period of time. A segment may contain data for more than one media content component if media content components are multiplexed (combination of media items or components).

The invention focuses on a video description in a manifest file (by taking the DASH MPD as an example). Even if the other elements of the media representation (e.g. audio, text . . . ) are not explicitly described, they can easily be incorporated in a more global media description as will be explained below.

More particularly, the invention focuses on media presentations that are composed of multiple video or audio content components. Those multiple video content components may correspond to multiple alternate videos in a multi-view or multi-camera media presentation. It may also correspond to different tiles (i.e. spatial sub-parts) when a high resolution media presentation is split into multiple spatial sub-parts, each spatial sub-part forming a video content component. By splitting a video into tiles, if the user of a low capacity application wants to display or focus on sub-parts of the video, only the tiles corresponding to the sub-part can be transmitted. This process allows keeping a video portion with a good quality.

In the context of DASH, the known standard "ISO BMFF" ("Base Media File Format") is used to encapsulate media content components into media data segments in order to form the media presentation. For instance, video content components can represent video bit streams encoded with the format MPEG4, AVC, SVC, HEVC, scalable or multi-view HEVC.

Classically, DASH defines identifiers as part of the attributes that defines the different elements that compose an MPD (e.g. AdaptationSet or Representation 'id' attributes). Those identifiers are defined only within the scope of a time period called "Period" for DASH and so they don't allow to follow the same content across Periods. DASH defines a specific identifier called "AssetIdentifier" at Period level that allows recognizing that a Period is the temporal continuity of one or more previous Periods, but it doesn't always allow recognizing the same media content component over different periods in all cases.

Moreover identifiers can be provided at a finer level called Adaptation Set level. The adaptation set level corresponds to the parameters related to a media item or combination of media items for the given time period. The document m33112 (Yasuaki Tokumo and al., "DASH: signaling the continuity of adaptation sets across periods", 108 MPEG meeting; Valencia; (MOTION PICTURE EXPERT GROUP or ISO/IEC JTC1/SC29/WG11), m33112, April 2014) describes an identifier inserted at the Adaptation Set level.

Nevertheless, the existing solutions does not allow having an efficient parsing of the MPD by the user in many situations, in particular when the media content is partitioned, for example spatially partitioned.

Indeed even if solutions exist for following media content and its parameters over several periods, these solutions do not allow:

following a specific object defined over a portion of the media content, especially when the object does not belong to the same portion of media content for different periods;

indicating that an adaptation set should be related to several different media contents or indicating that several spatial sub-parts are the temporal continuity in space across different time periods.

Moreover even if solutions exist for following media components over different periods, it may be needed to identify for a given period a media component having common contents with another media component.

SUMMARY OF THE INVENTION

The present invention has been devised to address one or more of the foregoing concerns.

According to a first aspect of the invention there is provided a method for streaming data corresponding to one or more media items or combinations of media items, said media items or combinations of media items being organized into time periods. The method comprises:
- transmitting, by a server, a description file to a client device, said description file being organized into data boxes, each one being related to a time period, at least one box comprising one or more level-one sub-boxes comprising parameters related to a media item or combination of media items for the given time period, each level-one sub-box being organized into one or more level-two sub-boxes dedicated to temporal segments of the corresponding media item or combination of media items for the given time period, each level-two sub-box being organized into one or more level-three sub-boxes, each one being related to a portion of the temporal segment for the given media item or combination of media items,
- wherein at least one identifier is inserted into at least one second level or third-level sub-box for at least a first and a second period.

For example, a first-level sub-box is an Adaptation Set, a second-level sub-box is a Representation and a third-level sub-box is a Sub-Representation when the method is compliant with ISOBMFF part 15.

The identifier preferably relates to or corresponds to the content of the media, and in embodiments the value of the identifier is the same across the first and second periods, indicating continuity of content.

Embodiments of the first aspect of the invention offer the advantage of providing editorial continuity among several time periods even for tiled videos.

In an embodiment, at least two main sub-boxes belonging to the same level comprises at least one identifier, each one for identifying one media item or combination of media items, and at least one additional sub-box belonging to the same said level comprises at least two identifiers, one identifier belonging to one of the two main sub-boxes and one other identifier belonging to the other main sub-box.

In an embodiment, the media items are tiled videos.

In an embodiment, at least one identifier is inserted into at least one second level or third-level sub-box for at least two periods, the tiling configuration of the tiled video is different over the first and the second period.

In an embodiment, each second level box comprises at least a first and a second third-level boxes and when at least one identifier is inserted into at least one third-level sub-box for at least two periods, said identifier is inserted in the first third-level sub-box for the first period and the second third-level sub-box for the second period.

In an embodiment, the first third-level sub-box is related to a first set of tiles comprising one or more tiles, and the second set of tiles is related to a second set of tiles comprising one or more tiles, the first and the second set being different by at least one tile.

According to a second aspect of the invention there is provided a method for streaming data corresponding to one or more media items or combinations of media items, said media items or combinations of media items being organized into time periods. The method comprises:
- transmitting, by a server, a description file to a client device, said description file being organized into data boxes, each one being related to a time period, at least one box comprising a plurality of level-one sub-boxes comprising parameters related to a media item or combination of media items for the given time period, each level-one sub-box being organized into a plurality of level-two sub-boxes dedicated to temporal segments of the corresponding media item or combination of media items for the given time period, each level-two sub-box being organized into a plurality of level-three sub-boxes, each one being related to a portion of the temporal segment for the given media item or combination of media items, and
- Wherein at least two main sub-boxes belonging to the same level comprises at least one identifier, each one for identifying one media item or combination of media items, and at least one additional sub-box belonging to the same said level comprises at least two identifiers, one identifier belonging to one of the two main sub-boxes and one other identifier belonging to the other main sub-box.

For example, a first-level sub-box is an Adaptation Set, a second-level sub-box is a Representation and a third-level sub-box is a Sub-Representation when the method is compliant with ISOBMFF part 15.

The second aspect of the invention allows providing a temporal continuity of the spatial area belonging to different media items according to the considered time period.

In an embodiment the media items are tiles from a tiled video.

In an embodiment the main and additional sub-boxes are first-level sub-boxes.

In an embodiment the media items are tiled videos.

In an embodiment the main and additional sub-boxes are third-level sub-boxes.

In an embodiment, said method being compliant with ISOBMFF part 15.

In an embodiment, the identifier is an Asset Identifier (AssetIdentifier).

According to a third aspect of the invention there is provided a computer program product for a programmable apparatus, the computer program product comprising instructions for carrying out each step of the method as mentioned above when the program is loaded and executed by a programmable apparatus.

According to a fourth aspect of the invention there is provided a computer-readable storage medium storing instructions of a computer program for implementing the method as mentioned above.

According to a fifth aspect of the invention there is provided a device for encapsulating multi-layer partitioned timed media data in a server comprising means adapted for carrying the method as mentioned above.

In an embodiment it is incorporated in a server device.

BRIEF DESCRIPTION OF THE DRAWINGS

Other particularities and advantages of the invention will also emerge from the following description, the invention being described purely by way of example and being illustrated by the accompanying drawings, in which.

DETAILED DESCRIPTION OF EMBODIMENTS OF THE INVENTION

Figure 1A:
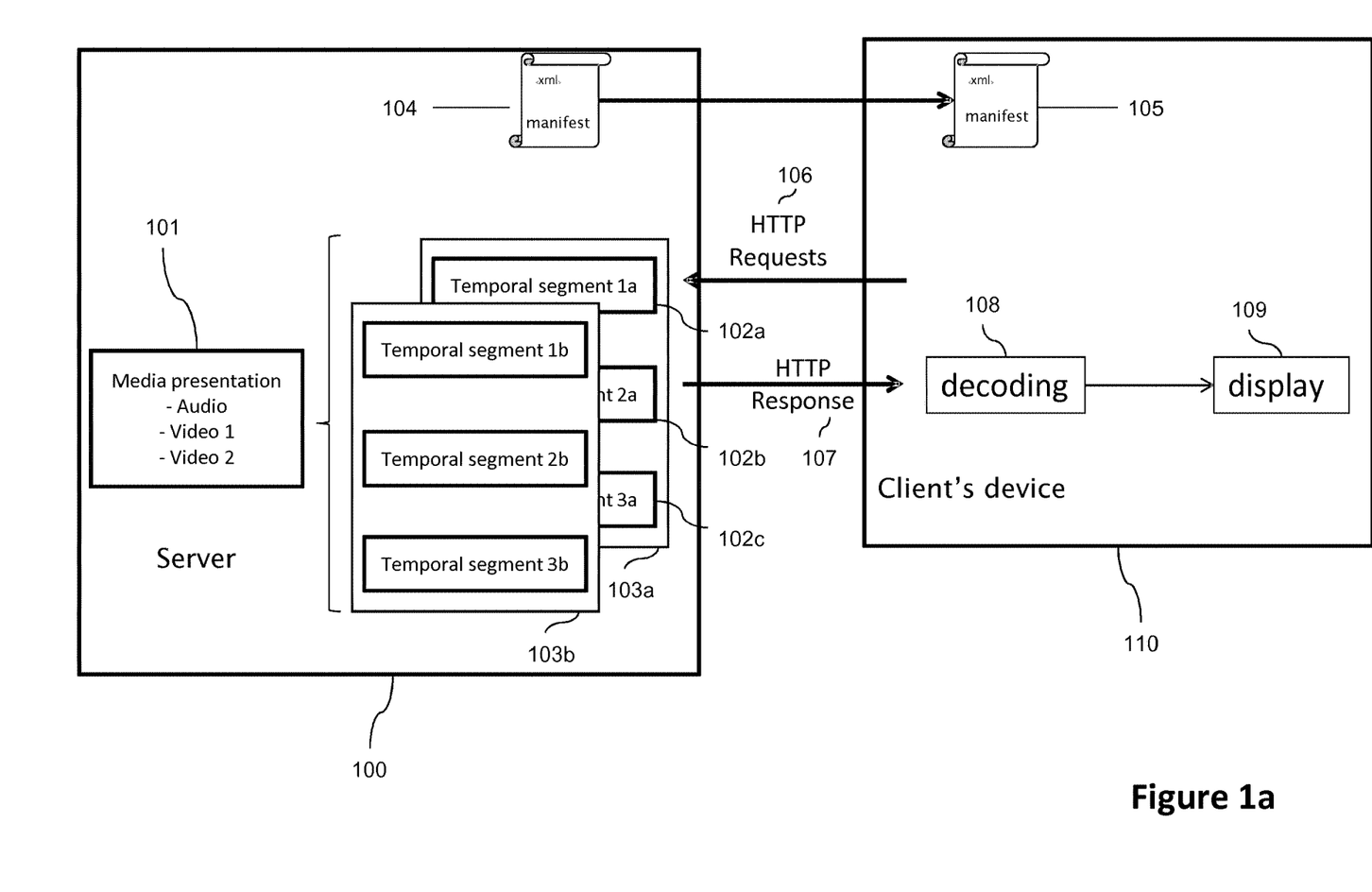
FIG. 1a illustrates a block diagram about an example of the general principle of the Media streaming over HTTP.

FIG. 1a describes the general principle of the Media streaming over HTTP, like DASH in particular. Most of the new protocols and standards for Media streaming over HTTP are based on this principle.

A media server 100 contains different media presentations. An example of media presentation 101 is illustrated. It contains here one audio content component and two video content components. The way the media presentation is constructed is well known by the man skilled in the art. For each media content component, this media presentation proposes several versions, 103a and 103b, of each media content component that have been temporally split into small independent and consecutive temporal segments 102a, 102b and 102c (for example mp4 segments). Those temporal segments can be addressed and downloaded independently. The downloading addresses of the segments are HTTP addresses. (One HTTP address associated to each temporal segment of each media content component) They are set by the server 100 for each one of these temporal segments.

A manifest file 104 (or description file) is a formatted document (classically an XML document). It describes each media content component and associated temporal media segments e.g. type of media (audio, video, audio-video, text . . . ), coding format, and time duration of the segment. Moreover it associates an URL to each media content segment that is described.

The manifest file 104 is sent to a client device 110 related to a client or a user. By reading the received manifest file 105, the client can know the association between temporal segments of the different versions of media content components and the HTTP addresses designating the temporal segments. Moreover, the manifest file 105 gives the information that characterizes each version of each media content component that composes the media presentation. For instance, the information may include resolution, codec format, and/or bit-rate.

The client device 110 can therefore emit HTTP requests 106 for downloading the temporal segments that he wants, those temporal segments being described in the received manifest file 105.

As a response, the server 100 sends the requested temporal segments, 107. These temporal segments can be decoded 108 by the client device 110 for display 109.

Figure 1B:
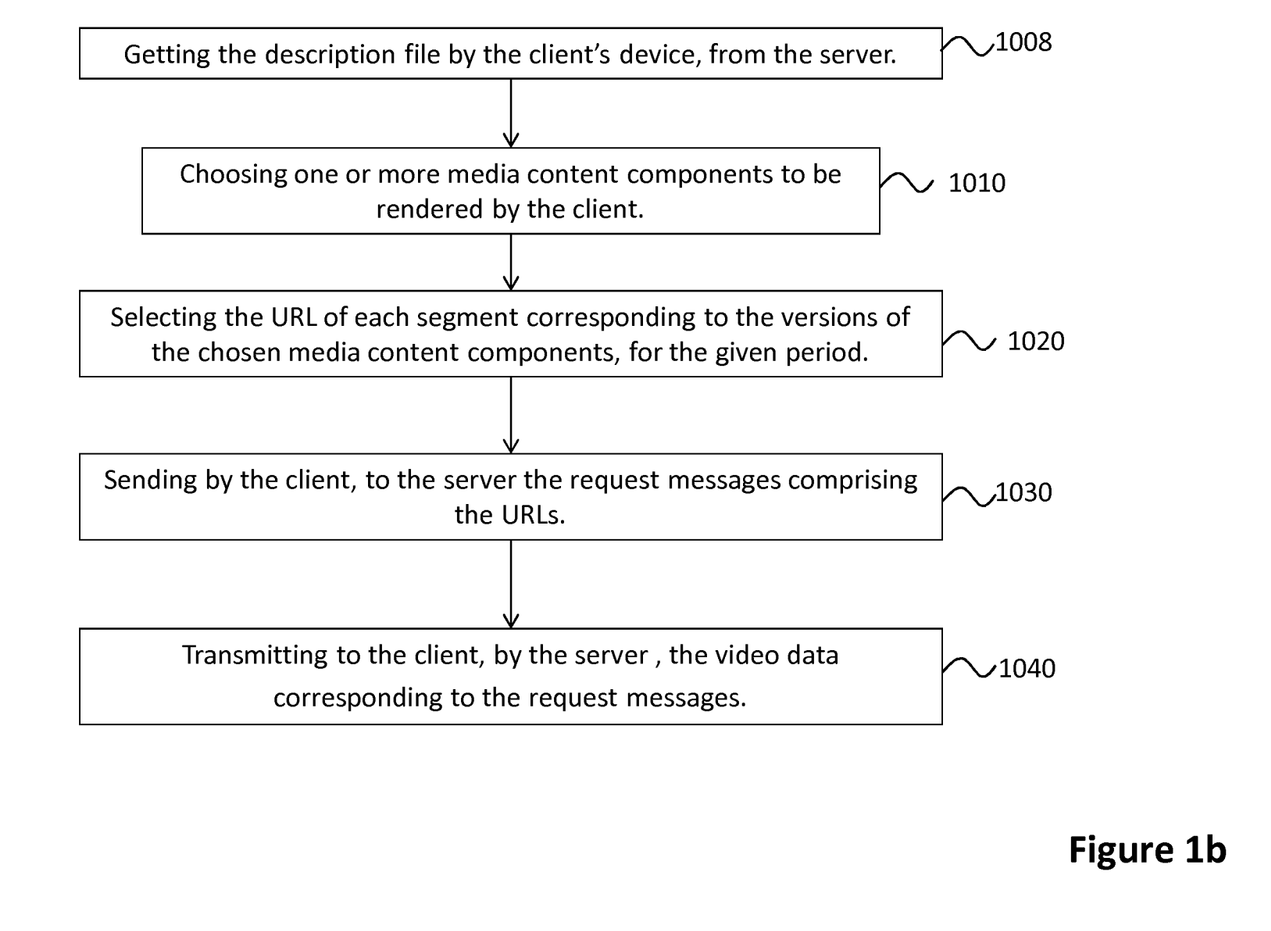
FIG. 1b is a flow chart, explaining more in detail the media streaming over HTTP according to an embodiment of the invention, in particular when a frame is divided into tiles.

FIG. 1b illustrates more precisely the Media streaming over HTTP (particularly in DASH) according an embodiment of to the invention.

First a client device gets a description file (or MPD in DASH) from a server, step 1008. It can get this description file only once at the beginning of the media presentation or the client can get it once at the beginning of the media presentation and then the client can obtain several update of the description file throughout the media presentation duration.

Figure 3:
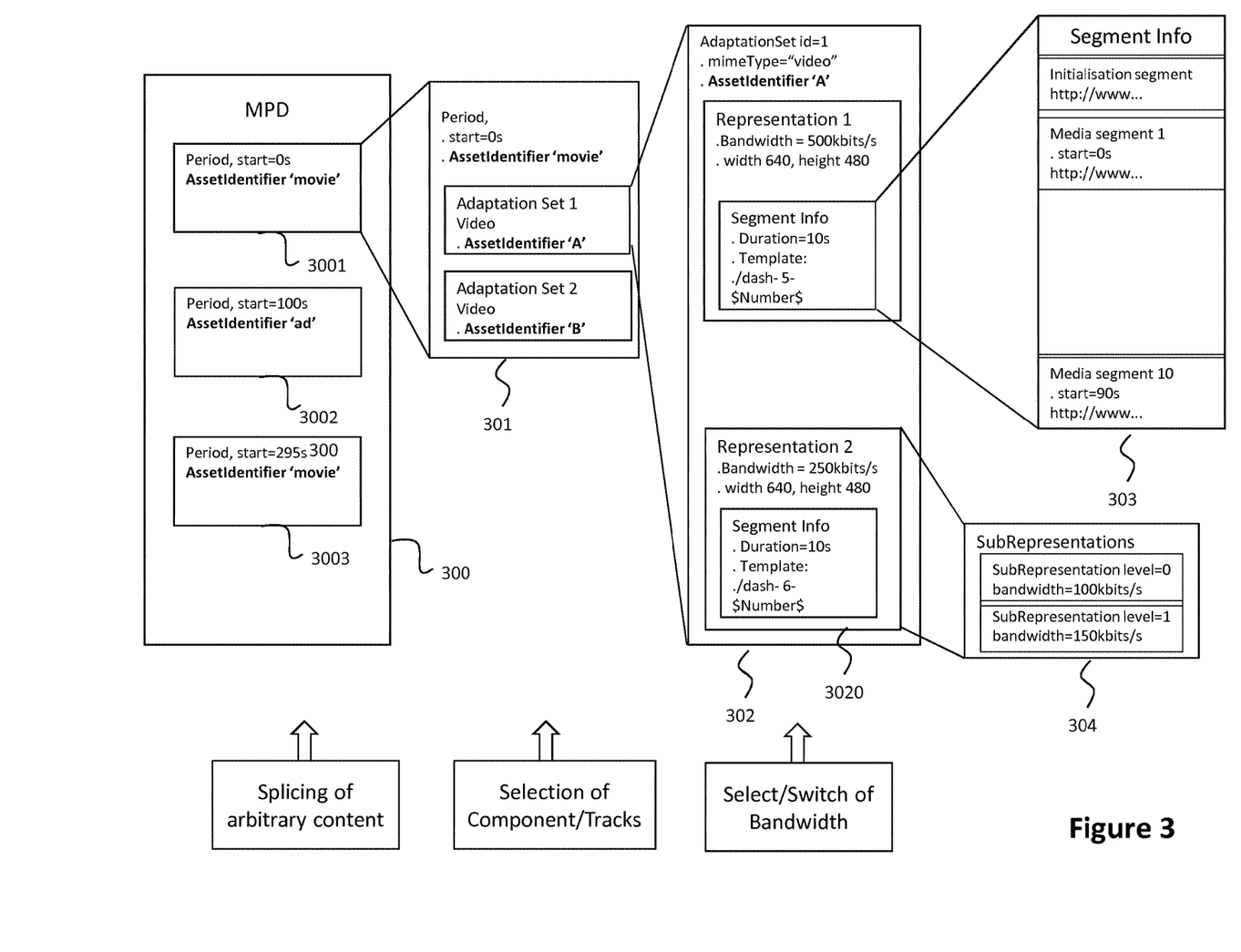
FIG. 3 illustrates a Media Presentation Description according to the prior art.

This description file, as further described in FIG. 3, includes data about all media content components available within one or more periods of time.

Each time the client receives a new or updated description file, he or it chooses, step 1010, one version of one or more media content components that he wants to render. Its choice is done according to user's preferences or selections, network status (e.g. available bandwidth) and rendering capacity of the client (e.g. display resolution, supported codec, computation performance).

The URLs of the temporal segments corresponding to the versions of media content components chosen by the client are selected by the client device, step 1020.

Request messages for the selected temporal segments are sent from the client device to the server, step 1030. Each request message comprises the URL of one temporal segment with optionally a byte-range if the same URL designates different temporal segments.

In response to the request messages, the server sends to the client device the video data (meaning the segments as detailed below), step 1040.

In addition, at step 1010, in case of Period changes, the client may also want to select the media content components depending on its choices done during a previous Period, for instance to ensure an editorial continuity of media content components from one Period to another. To address this issue, DASH already defines a specific descriptor called "AssetIdentifier" defined at Period or AdaptationSet level only. Thanks to this descriptor the client can differentiate Periods, for instance, related to a same movie from Periods corresponding to advertisements.

Figure 4:
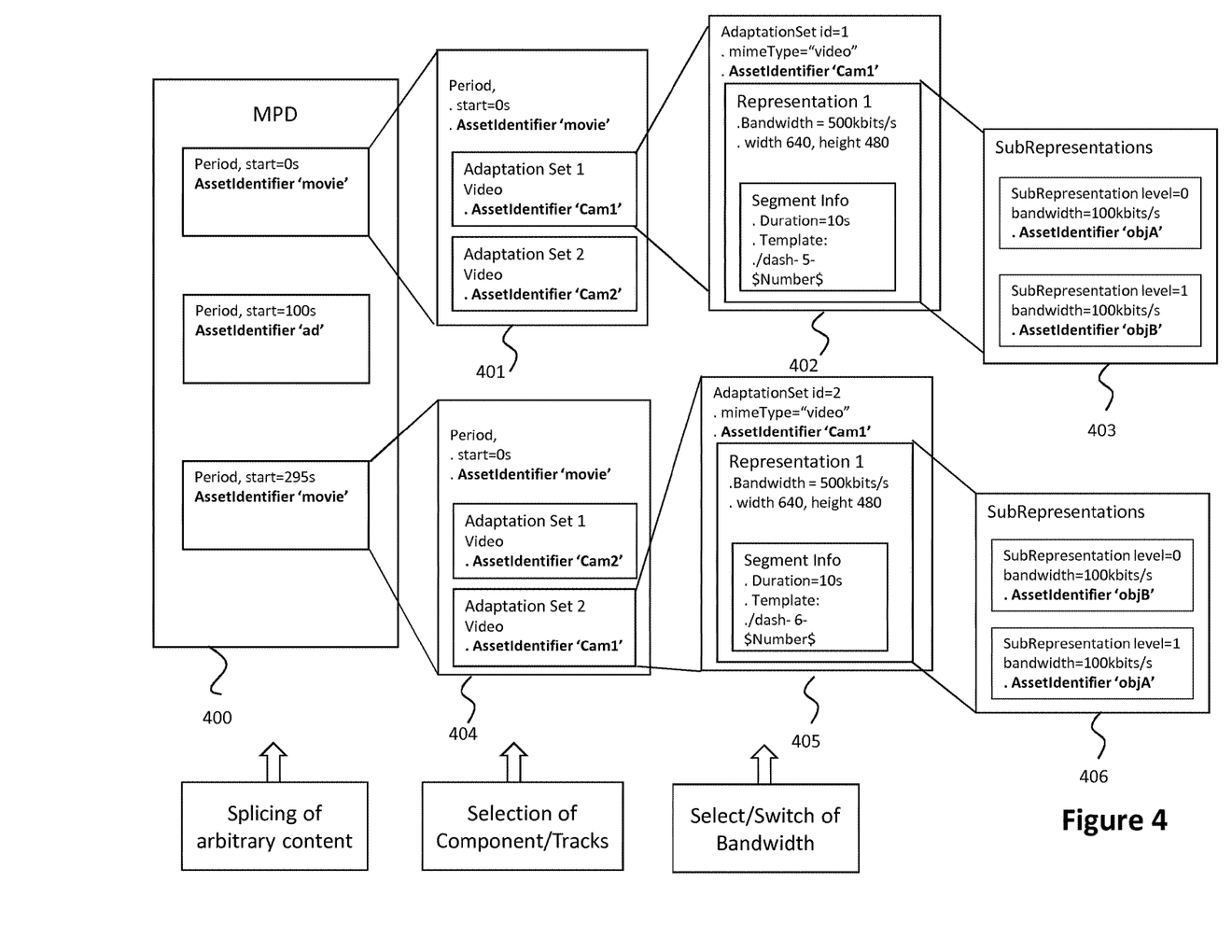
FIG. 4 illustrates a Media Presentation Description according to an embodiment of the invention.

Nevertheless, the existing solutions does not allow having an efficient parsing of the MPD by the user in many situations, in particular when the media content is partitioned, for example spatially partitioned as described hereafter in reference to FIG. 4.

Figure 2A:
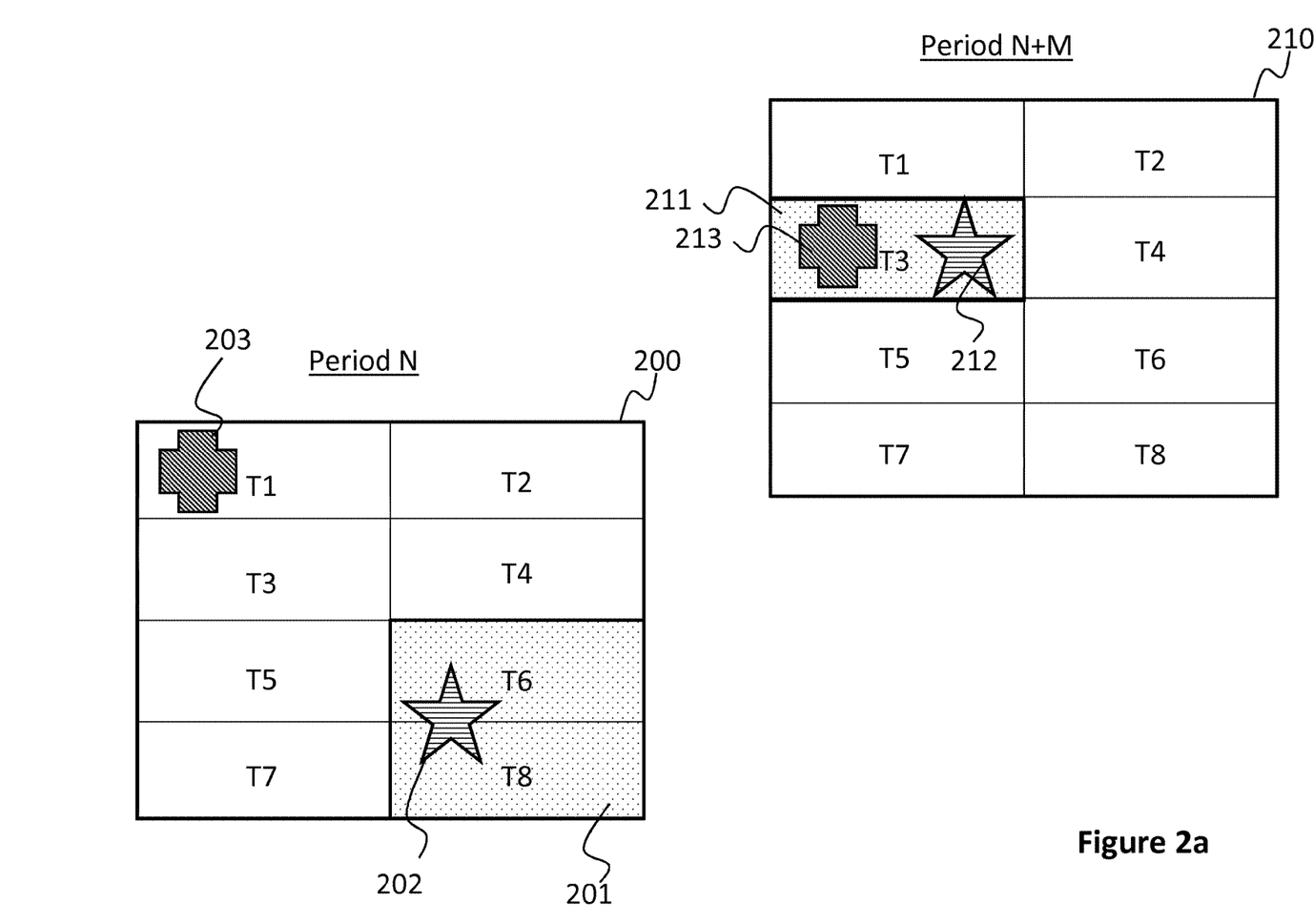
FIG. 2a schematically represents two frames for two different time periods, each frame being divided into tiles, and some objects spatially moving from a time period to another one.
Figure 2B:
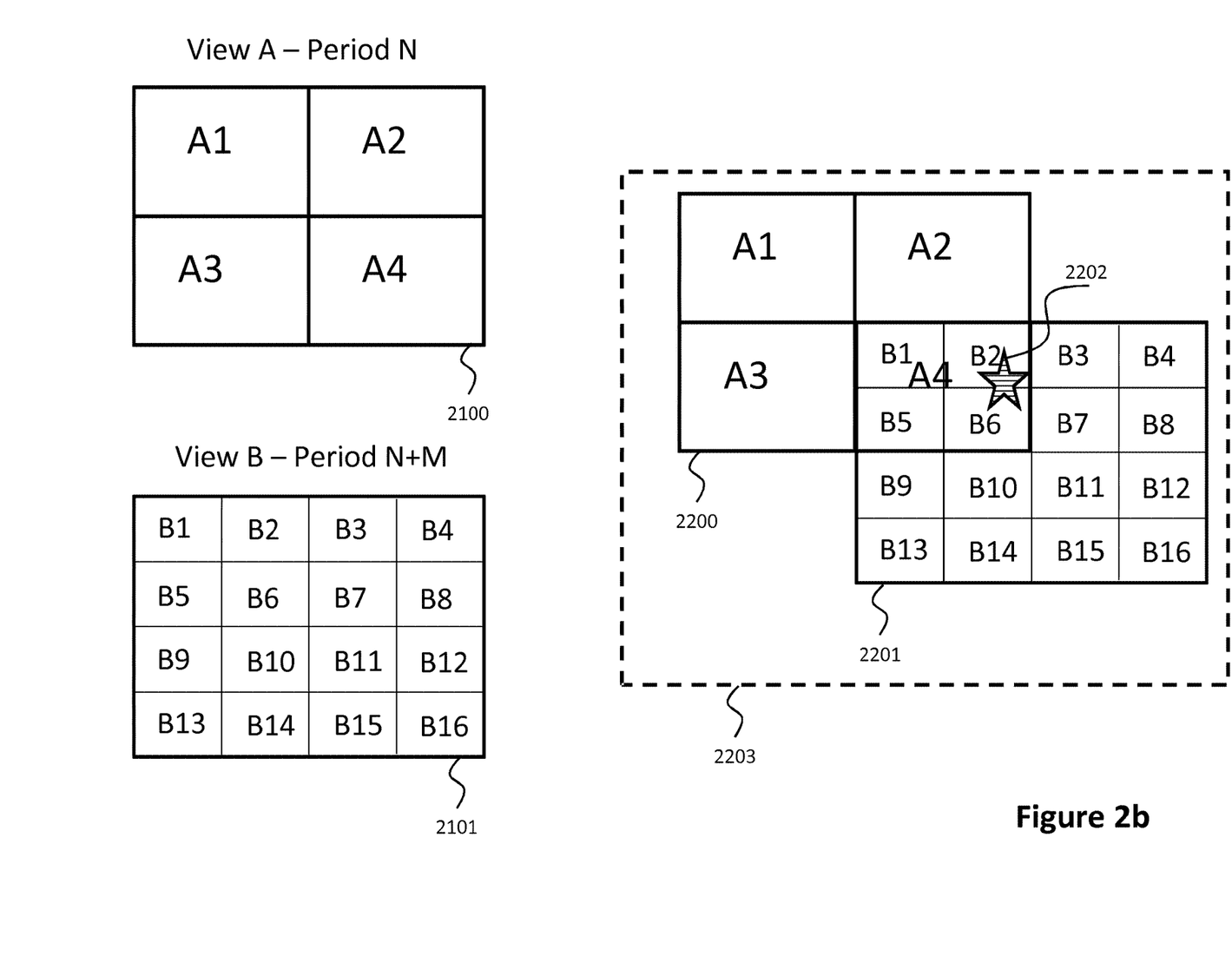
FIG. 2b schematically represents two frames for two different time periods, each frame being divided into tiles according to a different tiling configuration for each time period.

FIGS. 2a and 2b illustrate scenarios that existing solutions cannot manage correctly or efficiently through existing identifiers.

FIG. 2a illustrates a video frames 200 and 210 which are here divided into eight tiles T1, T2, . . . , T8.

According to DASH and ISOBMFF encapsulation, each tile can represent a different video content component or a sub-part of a video content component. In the former case, each tile is represented in a MPD by defining one AdaptationSet per tile. In the latter case, each tile is represented by defining one single AdaptationSet representing the whole frame where each Representation is composed of several SubRepresentations (i.e. sub-part of a Representation), one SubRepresentation per tile (as represented by 304 in FIG. 3). Tile properties are described using a Spatial Relationship Descriptor that consists in using either SupplementalProperty or EssentialProperty descriptors with @schemeIdURI equal to "urn:mpeg:dash:srd:2014" (see document m33112 above mentioned). The @value attribute provides a comma separated list of values including the tile coordinates (x, y width, and height).

A video frame 200 represents a video during the Period N. There are two objects 202 and 203. The object 202 is covered by tiles T6 and T8, and the object 203 is covered by a tile T1. Another video frame 210 represents the same video during another Period later in time (noted Period N+M). Between the Period N and N+M, the objects 202 and 203 have moved and they are represented by objects 212 and 213 respectively, both covered by the tile T3.

If the tiles are described at SubRepresentation level (third-level sub-boxes), existing solutions that provide identifier at Period and AdaptationSet levels only, do not allow a rapid and efficient matching by an application across multiple Periods. In other words, with existing solutions an application cannot recognize the first object 213 as being the same object as the other first object 203 or the second object 212 as being the same object as the other second object 202. Moreover existing solutions do not allow identifying multiple objects at AdaptationSet or SubRepresentation levels (e.g. the tile T3 in frame 210 covers two objects 212 and 213).

FIG. 2b also illustrates two different video frames during two different Periods (Period N and Period N+M). Each frame is composed of several tiles and represents two different views (view A and view B). A frame 2100 is composed of four tiles (A1 to A4) and another frame 2101 is composed of sixteen tiles (B1 to B16). A box 2203 is virtual and illustrates schematically the spatial relationship between the two views at Period N and Period N+M. As described in the schematic 2203, the tiles B1, B2, B5 and B6 cover a same spatial area during the Period N+M as the tile A4 during the Period N. In other words, B1, B2, B5, B6 represent the temporal continuity of the spatial area covered by the tile A4. But because of different tiling organisations between the frame 2100 and the frame 2101, an application cannot see the temporal continuity covered by the tile A4. Again existing solutions do not allow expressing such relationship at SubRepresentation level. Moreover, multiple identifiers per tile are needed for instance to represent the relationship between A4 and B1, B2, B5, B6 but also to identify the object 2202 in tiles A4, B2 and B6, which is not possible with existing solutions.

FIG. 3 illustrates an example of the hierarchical content of a DASH manifest file or MPD according to the prior art. This manifest file describes the media content of the media presentation available at the server and the association between each media component or item, also called media data, and the HTTP addresses. In the MPD the media content is organized into several boxes and sub-boxed at different levels, as explained more in detail below.

For example, the media presentation may be temporally split into coarse-grained periods called Period (splicing of arbitrary content).

A "Period" at MPD level describes all media components that are available for a period of time (could be the complete duration of the media presentation if there is only one Period). Within this period, a media content for a component can be composed of several data segments corresponding to smaller period of time previously mentioned, to allow easy streaming/random accessing/switching.

The XML MPD contains all the data related to each period. By receiving this information, the client is aware of the content of each period of time.

As said above and as represented in FIG. 3, the Media Presentation Description file 300 is divided into several parts 3001, 3002 and 3003, each one being associated to a Period. For example the second Period is comprised into 100 s and 294 s.

Each Media Presentation's Period contains data that describes the available media content components for the corresponding period of time. Content (i.e. the set of media content components) in different Periods may be completely independent from a period to another or in the contrary two or more Periods of a Media Presentation Description may comprise media content components belonging to a same whole content. In other words, a whole content may be partitioned and shared over several Periods consecutive or not. Each Media Presentation Description's Period may contain a descriptor, for example called AssetIdentifier for identifying content parts related to a same whole content. The identifier allows identifying parts of the same content shared among different Periods. If two different Periods contain similar AssetIdentifiers then the media content for the two Periods belong to the same whole content (also called asset).

Thus as illustrated in the MPD the first 3001 and third 3003 Periods comprise the same AssetIdentifier 'movie'. Consequently according to the definition given above, the contents associated to these two periods are parts of the same whole content. On the contrary the second Period 3002 includes a different AssetIdentifier 'ad'. It informs that the content is not a part of the same content related to the first and third Periods 3001, 3003.

For the sake of clarity, one of the Media Presentation's Period 3001 is illustrated more in detail in 301.

A Period may be composed of several "adaptation set" elements. An Adaptation Set represents a set of interchangeable encoded versions of one or several media content components. For instance, the Period 301 is composed of two Adaptation Sets (or level-one sub-boxes) corresponding to two different video content components. An Adaptation Set may also directly contain a multiplexed form of several media content components also called a combination of media items (e.g. Audio/Video). Said differently, if the media content components are encapsulated into ISOBMFF, each adaptation set is associated to separate tracks from the ISOBMFF. In this example, the first group adaptation set is associated to a first video track, and the second adaptation set is associated to a second video track.

An adaptation set structure 302 contains information organized into attributes and/or elements and/or descriptors that describe the different possible or alternative representations (these attributes and/or elements are referred to as level two sub-boxes) (for example "Representation") 3020 of the encoded video available at the server. In this example, a first representation "Representation 1" is an encoded video of spatial resolution 640×480 encoded at the bit rate of 500 kbit/s. The second representation "Representation 2" is the same video but encoded at 250 kbit/s. Each of this video can be downloaded by HTTP requests if the client knows the HTTP addresses related to the video. The association between content of each representation and HTTP addresses is done by using an additional temporal sub-layer.

As illustrated by the reference 303, the video representation "Representation 1" is split into temporal segments (of 10 seconds in this example).

The first representation "Representation 1" gets a bandwidth of 500 kbits/s, a width of 640 pixels and a height of 480 pixels. More parameters are given by the field "Segment Info" 303 described below.

The second representation "Representation 2" gets a bandwidth of 250 kbits/s, a width of 640 pixels and a height of 480 pixels. This second representation may represent a decrease in quality compared to the first representation for instance. The client will be able to switch between the two different representations depending on the available bandwidth on the network.

Each temporal segment 303 is a content stored at the server that is accessible through an HTTP address. In addition, an initialization segment is available. This initialization segment contains MP4 initialization information (if the video has been encapsulated by using the ISO BMFF or extensions) describing the MP4 content of the encapsulated video. For example, it helps the client to instantiate the decoding algorithms related to the video. The HTTP addresses of the initialization segment and the media segments are given in the MPD (or description) file.

In addition, as illustrated by the reference 304, a Representation may be composed of several sub-boxes called SubRepresentations (or level-three sub-boxes). On contrary to Representation, SubRepresentation relies on specific boxes from ISOBMFF (subsegment index ('ssix') and level assignment ('leva') boxes) embedded into media segments to address sub-parts of those media segments. In other words, a SubRepresentation describes properties related to the content of the media component or the combination of media components that are embedded in the corresponding Representation. For instance, it may describe some embedded lower quality layer (e.g. some lower frame rate for a video as illustrated in the figure) or an embedded audio or video components if the Representation describes a mix of audio and video components. A SubRepresentation may also describe spatial sub-parts (or tiles) of a video.

The MPD as defined above is adapted for following or tracking a media component content over periods, but it is not suitable for a finer tracking for portions of a media component over different periods, for example one audio signal extracted from a mixed audio signal or one spatial tile (or several tiles) from a partitioned picture instead of a whole picture.

Thus if a user wants to track an object (for instance a person) contained over the tile "1" (see FIG. 2a) in for first Period and over the tile "2" for a second Period, then there is no efficient way to perform it with an MPD as illustrated in FIG. 3.

FIG. 4 illustrates an example of the hierarchical content of a DASH manifest file or MPD according to the invention. An MPD 400 is composed of three different periods of time ("Period"). As signaled by an identifier "AssetIdentifier" with value "ad" at Period level, the content of a second Period (i.e. the set of media content components) is completely independent from the two other Periods signaled with the AssetIdentifier "Movie". In this example, the content of a second Period represents an advertisement in the middle of a movie.

In each Period 401 and 404 corresponding to the movie, there are two video content components or Adaptation Set boxes as defined previously. A descriptor named "AssetIdentifier" defined in each Adaptation Set, allows retrieving the corresponding Adaptation Set box that represents the temporal continuity from another Adaptation Set across Periods. In this example, the AssetIdentifiers with the value 'cam1' indicate that the Adaptation Set "2" in the Period 404 is the editorial continuity of the Adaptation Set "1" from the Period 401.

According to an embodiment of the invention, it is proposed to extend the definition of this "AssetIdentifier" in DASH to define it at "RepresentationBaseType" level. In this way, the AssetIdentifier can be used not only at Period level but also at all other sub-levels: AdaptationSet (in particular for multiple AssetIdentifiers), Representation and SubRepresentation.

The MPD schema is then modified as follows:

```
<!-- Representation base (common attributes and elements) -->
    <xs:complexType name="RepresentationBaseType">
        ...
        <xs:element     name="InbandEventStream"     type="DescriptorType"
    minOccurs="0" maxOccurs="unbounded"/>
        <xs:element     name="AssetIdentifier"     type="DescriptorType"
    minOccurs="0">
        ...
    </xs:complexType>
```

In FIG. 4, each Adaptation Set 402 and 405, contains a version (or Representation) of a video content component that embeds several objects or tiles represented by several SubRepresentations 403 and 406. By defining the AssetIdentifier at SubRepresentation level, the client knows that the SubRepresentation with level 1 in 406 is the editorial continuity of the SubRepresentation with level 0 in 403. Without this identifier, the client cannot determine which SubRepresentation must be selected In addition, expressing such relationship can be particularly useful for instance if tiling is described at SubRepresentation level during Period N and then at Adaptation Set level during Period N+M. Indeed, when tiling is described at SubRepresentation level, a client has to download all the tiles because they all are embedded into a same media segment. But when tiling is described at AdaptationSet level, the client can only download the tiles covered by its region-of-interest. By providing cross-Period identifiers at SubRepresentation level, the client can more rapidly retrieve the associated tiles across Periods when it changes from Sub-Representation level tiling to AdaptationSet level tiling.

As illustration of the interest of the invention for object tracking, with reference to the FIG. 2a, if the client decides to view the object referenced 202, it can zoom on a portion 201 at the right bottom part of the image during the Period N. As illustrated in the FIG. 2a, this chosen portion 201 or Region-of-Interest (ROI) is encompassed by two tiles T6 and T8 that cover the object 202.

If the tiles are described at SubRepresentation level and the client wants to perform object tracking to follow for instance the object 202, thanks to this identifier it knows that it has to select tiles T6 and T8 at step 1010 during the Period N and only the tile T3 during the Period N+M.

In an alternative embodiment, instead of extending the "AssetIdentifier", an identifier according to the invention can be represented by reusing SupplementalProperty,EssentialProperty or any new descriptors with a specific schemeIdURI (e.g. "urn:mpeg:dash:id:2014" or "urn:mpeg:dash:objId:2014") where the @value attribute would correspond to the identifier value.

In an alternative embodiment, instead of extending the "AssetIdentifier", an identifier according to the invention can be represented by reusing the descriptor Role well known by the man skilled in the art.

In another alternative embodiment, in the context of object tracking, the descriptor representing the identifier may also include a description that characterizes the object identified (e.g. "This object represents a red umbrella"). This identifier could also be used to associate an object covered by several tiles and an object description that would be carried in a dedicated metadata content components.

Figure 5:
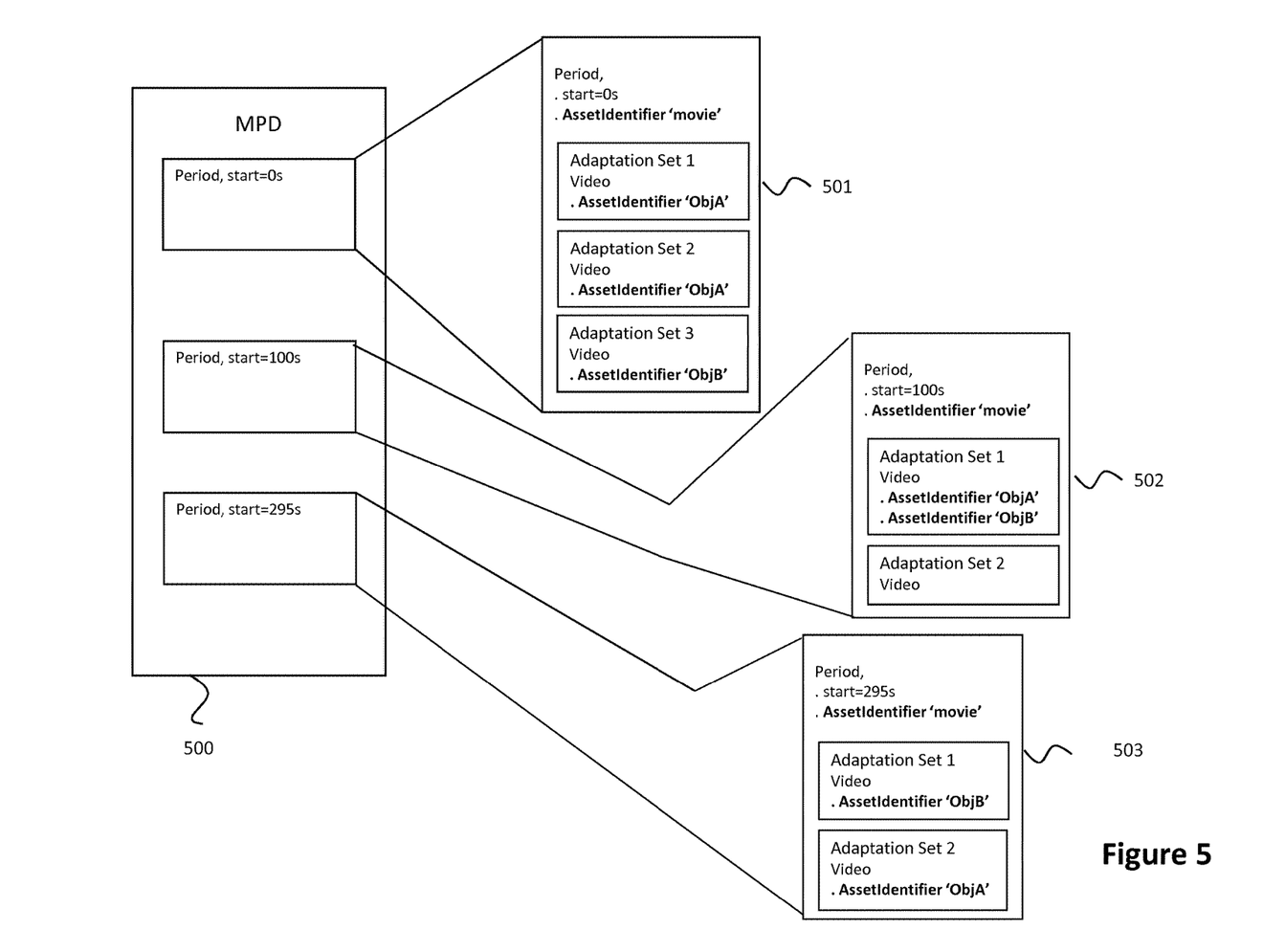
FIG. 5 illustrates a Media Presentation Description according to another embodiment of the invention.

FIG. 5 illustrates another example of the hierarchical content of a DASH manifest file or MPD according to the invention.

As illustrated in FIG. 2a, a frame 200 may contain several objects 202, 203 that are covered by different set of tiles (203 is covered by T1 and 202 is covered by T6 and T8). From one period to another, it may happen that those objects moved inside the video frame and by consequence, they are covered by a different set of tiles from one Period to another. It may also happen that several objects are covered by the same set of tiles as illustrated in video frame 210. Two objects 211 and 213 are present in tile T3. The prior art doesn't allow defining multiple AssetIdentifier in one level.

The invention proposes to authorize the definition of multiple AssetIdentifier at "RepresentationBaseType" level. In this way, the AssetIdentifier can be defined several times in each sub-level: AdaptationSet, Representation and Sub-Representation. In other words, for some applications, it is preferable to associate one element of type "RepresentationBaseType" to more than one identifier.

The MPD schema is then modified as follows:

```
<!-- Representation base (common attributes and elements) -->
    <xs:complexType name="RepresentationBaseType">
    ...
    <xs:element        name="InbandEventStream"       type="DescriptorType"
minOccurs="0" maxOccurs="unbounded"/>
    <xs:element name="AssetIdentifier" type="DescriptorType" minOccurs="0"
maxOccurs="unbounded"/>
    ...
    </xs:complexType>
```

The FIG. 5 illustrates such scenario. An MPD 500 is composed of three Periods. In reference to FIG. 2a, a Period 501 would correspond to the frame 200, the AdaptationSet "1" would correspond to the tile "T6" in frame 200, the AdaptationSet "2" to the tile "T8" and the AdaptationSet "3" to the tile "T1". An identifier 'ObjA' would correspond to the object 202 and 'another identifier ObjB' to the object 213. A Period 502 would correspond to the frame 210, the AdaptationSet "1" would correspond to the tile "T3" in frame 210 and the identifier 'ObjA' would correspond to object 212 and identifier 'ObjB' to object 213. In A third Period 503 (not represented in FIG. 2a), objects may move again and be covered by two different tiles. But thanks to the provided identifiers AssetIdentifiers 'ObjA' and 'ObjB', the identification and the tracking of the objects moving from tiles to other tiles according to the considered Period, is easier.

Figure 6:
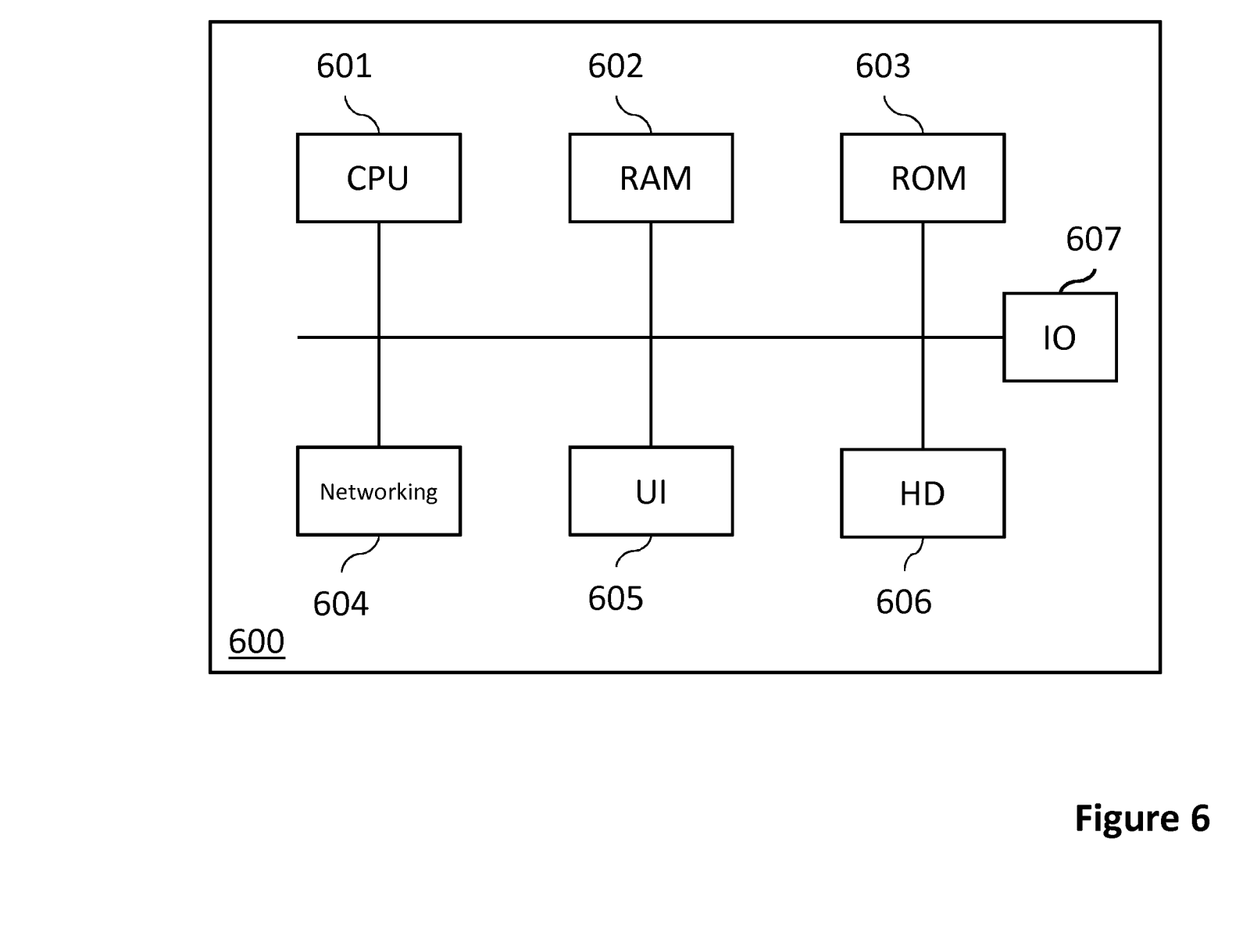
FIG. 6 represents a block diagram of a server or a client device in which one or more embodiments may be implemented.

FIG. 6 is a schematic block diagram of a computing device 600 for implementation of one or more embodiments of the invention. The computing device 600 may be a device such as a micro-computer, a workstation or a light portable device. The computing device 600 comprises a communication bus connected to:

- a central processing unit 601, such as a microprocessor, denoted CPU;
- a random access memory 602, denoted RAM, for storing the executable code of the method of embodiments of the invention as well as the registers adapted to record variables and parameters necessary for implementing the method for reading and writing the manifests and/or for encoding the video and/or for reading or generating the Data under a given file format, the memory capacity thereof can be expanded by an optional RAM connected to an expansion port for example;
- a read only memory 603, denoted ROM, for storing computer programs for implementing embodiments of the invention;
- a network interface 604 is typically connected to a communication network over which digital data to be processed are transmitted or received. The network interface 604 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 601;
- a user interface 605 for receiving inputs from a user or to display information to a user;
- a hard disk 606 denoted HD;
- an I/O module 607 for receiving/sending data from/to external devices such as a video source or display.

The executable code may be stored either in read only memory 603, on the hard disk 606 or on a removable digital medium such as for example a disk. According to a variant, the executable code of the programs can be received by means of a communication network, via the network interface 604, in order to be stored in one of the storage means of the communication device 600, such as the hard disk 606, before being executed.

The central processing unit 601 is adapted to control and direct the execution of the instructions or portions of software code of the program or programs according to embodiments of the invention, which instructions are stored in one of the aforementioned storage means. After powering on, the CPU 601 is capable of executing instructions from main RAM memory 602 relating to a software application after those instructions have been loaded from the program ROM 603 or the hard-disc (HD) 606 for example. Such a software application, when executed by the CPU 601, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone or a tablet that acts as a remote controller for a TV, for example to zoom in onto a particular region of interest. It can also be used from the same devices to have personalized browsing experience of the TV program by selecting specific areas of interest. Another usage from these devices and methods by a user is to share with other connected devices some selected sub-parts of his preferred videos. It can also be used in smartphone or tablet to monitor what happened in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for streaming data corresponding to one or more media components, the method comprising:
   transmitting, by a server, a description file to a client device, the description file comprising data boxes, each one being related to a time period, at least one box comprising one or more level-one sub-boxes comprising parameters related to a media component,
   wherein the parameters are related to the media component or a combination of media components for the given time period,
   wherein each level-one sub-box is organized into one or more level-two sub-boxes dedicated to temporal segments of the corresponding media component or of the combination of media components for the given time period,
   wherein each level-two sub-box is organized into one or more level-three sub-boxes, each one being related to a part of the temporal segment for the given media component or for the combination of media components, and
   wherein at least one identifier identifying a part of a media component or a combination of media component is inserted into at least one second level or third level sub-box for at least a first and a second time period, a same value of the identifier indicating that the first and second sub-boxes describe at least a same part of a media component or of a combination of media components across the first and second time periods.

2. The method according to claim 1, wherein when at least one identifier is inserted into at least one second level or third-level sub-box for at least two time periods, and wherein the tiling configuration of the tiled video is different over the first and the second time period.

3. The method according to claim 1, wherein each second level box comprises at least a first and a second third-level boxes and when at least one identifier is inserted into at least one third-level sub-box for at least two time periods, the identifier being inserted in the first third-level sub-box for the first time period and the second third-level sub-box for the second time period.

4. The method according to claim 3, wherein the first third-level sub-box is related to a first set of tiles comprising one or more tiles, and the second set of tiles is related to a second set of tiles comprising one or more tiles, the first and the second set being different by at least one tile.

5. A method for receiving streamed data corresponding to one or more media components, the method comprising:
   receiving, from a server, a description file, the description file comprising data boxes, each one being related to a time period, at least one box comprising a plurality of level-one sub-boxes comprising parameters related to a media component,
   wherein the parameters are related to the media component or combination of media components for the given time period,
   wherein each level-one sub-box is organized into one or more level-two sub-boxes dedicated to temporal segments of the corresponding media component or combination of media components for the given time period,
   wherein each level-two sub-box is organized into one or more level-three sub-boxes, each one being related to a part of the temporal segment for the given media component or combination of media components, and
   wherein at least one identifier identifying a part of a media component is inserted into at least one second level or third level sub-box for at least a first and a second time period, a same value of the identifier indicating that the first and second sub-box describes at least a same part of a media component or of a combination of media components across the first and second time periods.

6. A device for streaming data corresponding to one or more media components in a server comprising means adapted for:
   transmitting, by a server, a description file to a client device, the description file comprising data boxes, each one being related to a time period, at least one box comprising one or more level-one sub-boxes comprising parameters related to a media component,
   wherein the parameters are related to the media component or a combination of media components for the given time period,
   wherein each level-one sub-box is organized into one or more level-two sub-boxes dedicated to temporal segments of the corresponding media component or of the combination of media components for the given time period,
   wherein each level-two sub-box is organized into one or more level-three sub-boxes, each one being related to a part of the temporal segment for the given media component or for the combination of media components, and
   wherein at least one identifier identifying a part of a media component or a combination of media component is inserted into at least one second level or third level sub-box for at least a first and a second time period, a same value of the identifier indicating that the first and second sub-boxes describe at least a same part of a media component or of a combination of media components across the first and second time periods.

7. A device for receiving streamed data corresponding to one or more media components in a client comprising means adapted for:
   receiving, from a server, a description file, the description file comprising data boxes, each one being related to a time period, at least one box comprising a plurality of level-one sub-boxes comprising parameters related to a media component, wherein the parameters are related to the media component or combination of media components for the given time period, wherein each level-one sub-box is organized into one or more level-two sub-boxes dedicated to temporal segments of the corresponding media component or combination of media components for the given time period, wherein each level-two sub-box is organized into one or more level-three sub-boxes, each one being related to a part of the temporal segment for the given media component or combination of media components, and wherein at least one identifier identifying a part of a media component is inserted into at least one second level or third level sub-box for at least a first and a second time period, a same value of the identifier indicating that the first and second sub-box describes at least a same part of a media component or of a combination of media components across the first and second time periods.

8. The method according to claim 1, wherein the description file is a media presentation description file, and:
level-one boxes are Adaptation Sets,
level-two boxes are Representations, and
level three boxes are Sub-Representations.

9. The method according to claim 1, wherein the identifier is a DASH descriptor, a SupplementalProperty or an EssentialProperty.

10. The method according to claim 1, wherein the value of the identifier is defined by the attribute value of the DASH descriptor.

11. The method according to claim 1, wherein the media components are tiled videos.

12. A non-transitory computer-readable storage medium storing instructions of a computer program for implementing a method for streaming data corresponding to one or more media components, the method comprising:
transmitting, by a server, a description file to a client device, the description file comprising data boxes, each one being related to a time period, at least one box comprising one or more level-one sub-boxes comprising parameters related to a media component, wherein the parameters are related to the media component or a combination of media components for the given time period, wherein each level-one sub-box is organized into one or more level-two sub-boxes dedicated to temporal segments of the corresponding media component or of the combination of media components for the given time period, wherein each level-two sub-box is organized into one or more level-three sub-boxes, each one being related to a part of the temporal segment for the given media component or for the combination of media components, and wherein at least one identifier identifying a part of a media component or a combination of media component is inserted into at least one second level or third level sub-box for at least a first and a second time period, a same value of the identifier indicating that the first and second sub-boxes describe at least a same part of a media component or of a combination of media components across the first and second time periods.

13. A non-transitory computer-readable storage medium storing instructions of a computer program for implementing a method for receiving streamed data corresponding to one or more media components, the method comprising:
receiving, from a server, a description file, the description file comprising data boxes, each one being related to a time period, at least one box comprising a plurality of level-one sub-boxes comprising parameters related to a media component, wherein the parameters are related to the media component or combination of media components for the given time period, wherein each level-one sub-box is organized into one or more level-two sub-boxes dedicated to temporal segments of the corresponding media component or combination of media components for the given time period, wherein each level-two sub-box is organized into one or more level-three sub-boxes, each one being related to a part of the temporal segment for the given media component or combination of media components, and wherein at least one identifier identifying a part of a media component is inserted into at least one second level or third level sub-box for at least a first and a second time period, a same value of the identifier indicating that the first and second sub-box describes at least a same part of a media component or of a combination of media components across the first and second time periods.

* * * * *